(12) United States Patent
Jansen et al.

(10) Patent No.: US 8,226,359 B1
(45) Date of Patent: Jul. 24, 2012

(54) VARIABLE GUIDE VANE ACTUATOR WITH THERMAL MANAGEMENT

(75) Inventors: Harvey B. Jansen, Mesa, AZ (US); David K. Shields, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 0 days.

(21) Appl. No.: 13/305,483

(22) Filed: Nov. 28, 2011

Related U.S. Application Data

(63) Continuation of application No. 11/764,149, filed on Jun. 15, 2007, now Pat. No. 8,066,474.

(60) Provisional application No. 60/805,022, filed on Jun. 16, 2006.

(51) Int. Cl.
F01D 17/16 (2006.01)

(52) U.S. Cl. .......................... 415/160; 91/363 R; 92/144

(58) Field of Classification Search .................. 415/150, 415/160; 91/363 R; 92/144; 277/909
See application file for complete search history.

(56) References Cited

U.S. PATENT DOCUMENTS

| | | | | |
|---|---|---|---|---|
| 2,857,184 | A | * | 10/1958 | Mancusi, Jr. ............... 277/468 |
| 3,057,630 | A | * | 10/1962 | Sneed ........................ 277/558 |
| 3,068,018 | A | * | 12/1962 | Tydeman ................... 277/468 |
| 3,418,001 | A | * | 12/1968 | Rentschler et al. ......... 277/589 |
| 3,455,566 | A | * | 7/1969 | Hull et al. .................. 277/582 |
| 3,469,808 | A | | 9/1969 | D'Aulerio |
| 3,635,637 | A | | 1/1972 | Bergendahl |
| 3,805,835 | A | | 4/1974 | Jansen |
| 4,046,061 | A | * | 9/1977 | Stokes ........................ 91/459 |
| 4,109,921 | A | * | 8/1978 | Urbaschek ................. 277/452 |
| 4,418,559 | A | | 12/1983 | Huzyak |
| 4,582,466 | A | | 4/1986 | Szczupak |
| 4,618,311 | A | | 10/1986 | Miura et al. |
| 4,780,054 | A | | 10/1988 | Yano et al. |
| 5,044,879 | A | * | 9/1991 | Farrar ........................ 415/150 |
| 5,066,029 | A | * | 11/1991 | Gill ............................ 277/328 |
| 5,549,448 | A | * | 8/1996 | Langston ................... 415/149.4 |
| 5,690,347 | A | | 11/1997 | Juergens et al. |
| 6,318,234 | B1 | | 11/2001 | Mate |
| 6,390,129 | B2 | | 5/2002 | Jansen et al. |
| 6,918,569 | B2 | | 7/2005 | Jansen |
| 7,004,449 | B2 | | 2/2006 | Jansen |
| 7,096,657 | B2 | * | 8/2006 | Mahoney et al. ............ 60/39.25 |
| 7,121,525 | B2 | | 10/2006 | Gelez |
| 7,137,613 | B2 | | 11/2006 | Jansen |
| 2002/0029765 | A1 | | 3/2002 | Giavi et al. |
| 2002/0153501 | A1 | | 10/2002 | Yang et al. |
| 2003/0007865 | A1 | | 1/2003 | Chard et al. |
| 2003/0160197 | A1 | | 8/2003 | Kodama |
| 2004/0007893 | A1 | | 1/2004 | Motozawa et al. |
| 2004/0011979 | A1 | | 1/2004 | Seo et al. |
| 2004/0083993 | A1 | | 5/2004 | Seale et al. |
| 2004/0184937 | A1 | | 9/2004 | Hueppchen |
| 2004/0206320 | A1 | | 10/2004 | Sedda et al. |
| 2004/0217313 | A1 | | 11/2004 | Sedda et al. |
| 2004/0238773 | A1 | | 12/2004 | Wang et al. |
| 2005/0097880 | A1 | * | 5/2005 | Jansen ........................ 60/39.281 |

* cited by examiner

*Primary Examiner* — Edward Look
*Assistant Examiner* — Aaron R Eastman
(74) *Attorney, Agent, or Firm* — Quarles & Brady LLP

(57) ABSTRACT

A variable guide vane actuator for positioning the guide vanes of a turbine engine in a hypersonic missile uses compressor exhaust to drive a linked, floating piston assembly that is coupled to the guide vanes. The relatively low pressure compressor exhaust is metered by a valve to drive the piston arrangement to accurately position the guide vanes in proportion to the input control signal. Reliability and accuracy gains are achieved by inhibiting the effects of vibration and thermal distortion through the elimination of piston/bore contact, the use of a rigid, cantilevered mounting arrangement and cooling with the pre-combusted liquid fuel.

18 Claims, 12 Drawing Sheets

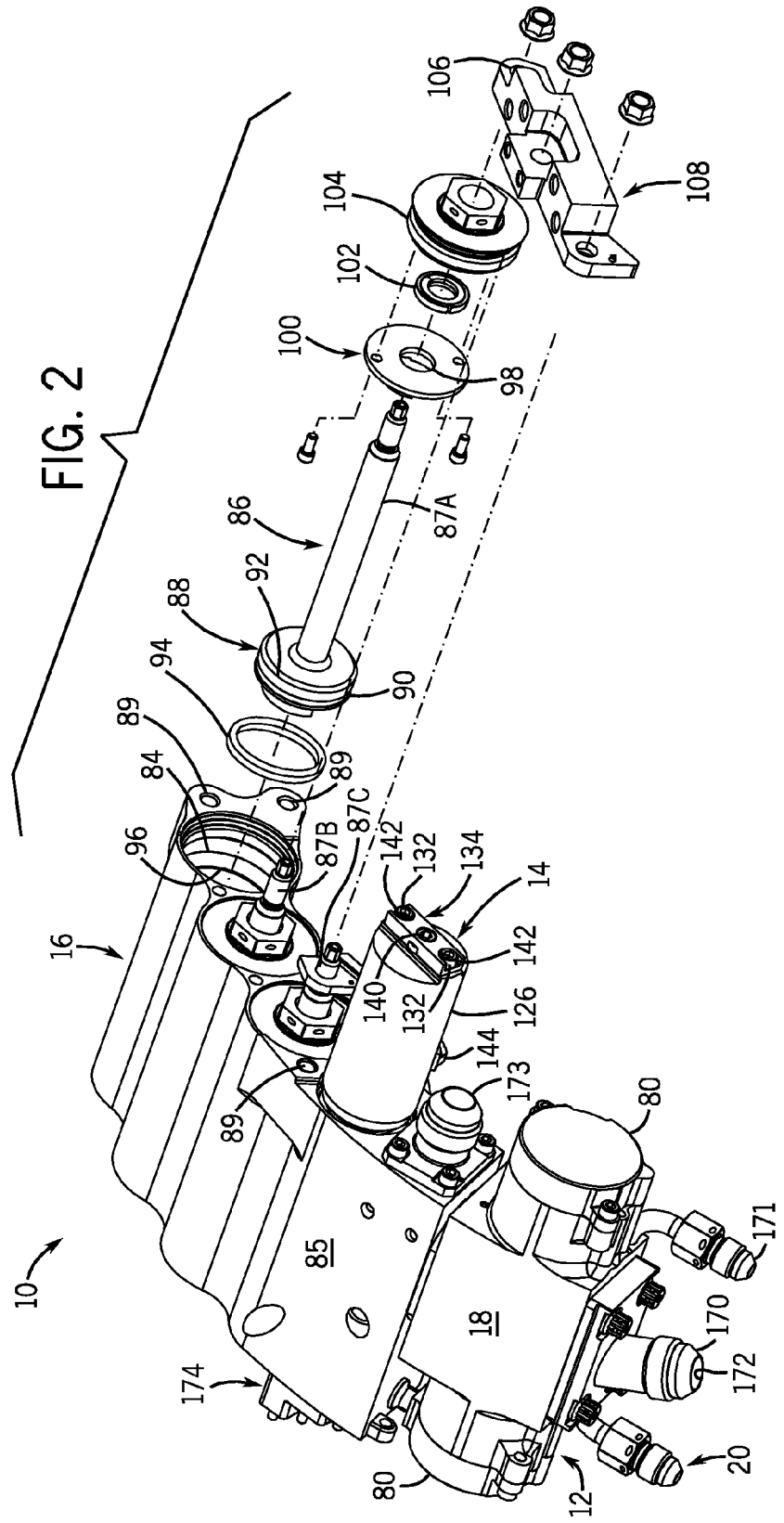

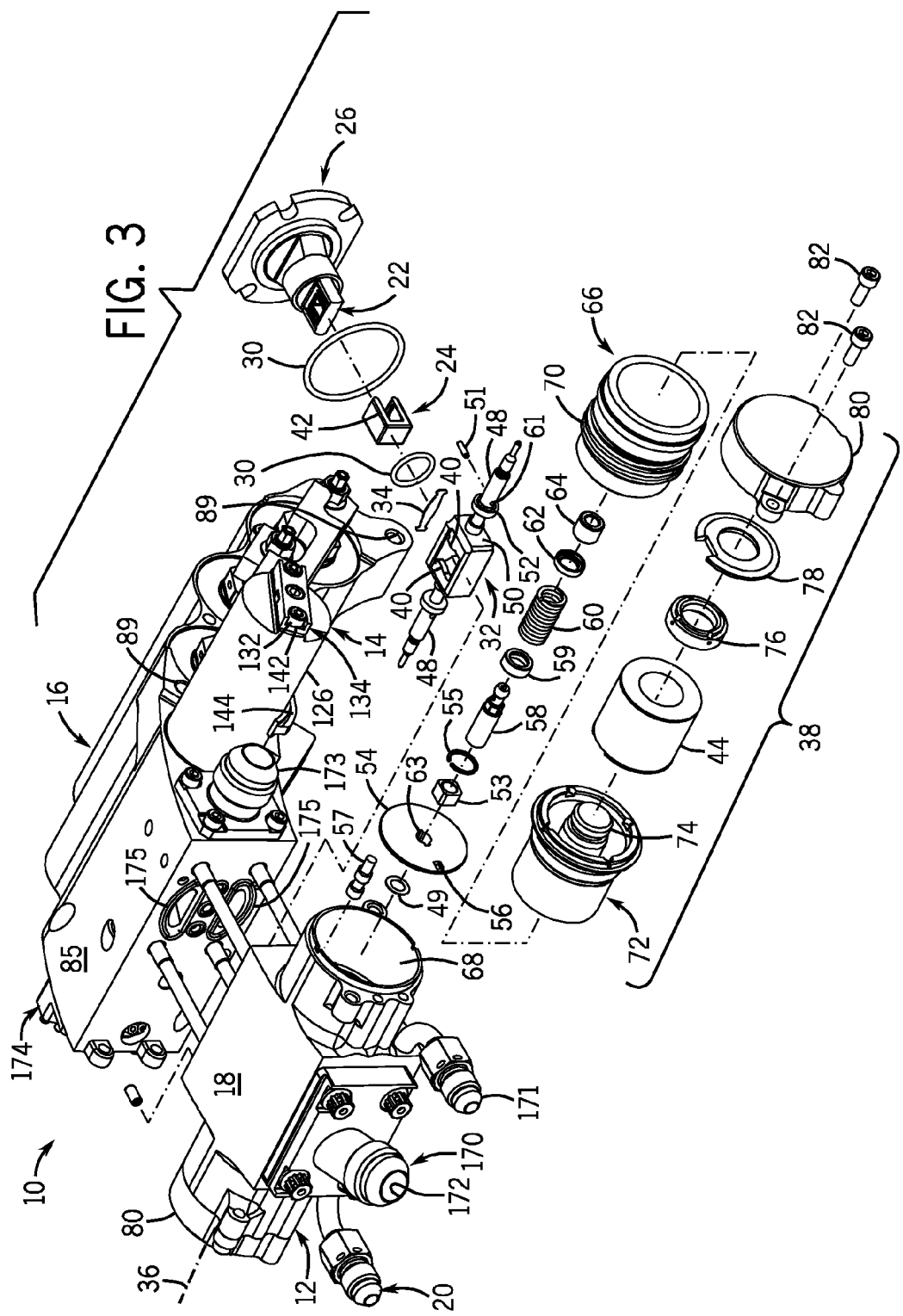

VARIABLE GUIDE VANE ACTUATOR WITH THERMAL MANAGEMENT

CROSS-REFERENCE TO RELATED APPLICATIONS

This application is a continuation of U.S. application Ser. No. 11/764,149 filed on Jun. 15, 2007 now U.S. Pat. No. 8,066,474, which claims priority to U.S. provisional application No. 60/805,022 filed on Jun. 16, 2006, the entire disclosures of which are incorporated by reference as though fully set forth herein.

STATEMENT OF FEDERALLY SPONSORED RESEARCH OR DEVELOPMENT

This invention was made with government support under N00014-04-D-0068 awarded by the Office of Naval Research. The government has certain rights in the invention.

BACKGROUND

The present disclosure relates to gas turbine engines, and more particularly, to an actuator for varying the position of guide vanes in a gas turbine engine.

Gas turbine engines may be used to power various types of flight vehicles, both manned and unmanned. The basic principles and operation of gas turbine engines are generally well understood. Air is funneled into an inlet of the engine where it is compressed and ignited causing the air and fuel to rapidly expand. The rapid expansion provides energy to propel the engine either by thrust or a combination of thrust and a rotating fan (e.g., as in a turbofan engine).

As a simplistic example, a gas turbine engine may include four major sections, a compressor section, a combustor section, a turbine section, and an exhaust section. Air is funneled through an inlet into the compressor section where the compressor raises the pressure of the air it receives from the inlet. Depending on the application requirements, multiple compressors may be used to increase the pressure of the air as it moves through the compressor section.

The compressed air from the compressor section then enters the combustor section, where typically a ring of fuel nozzles injects a steady stream of fuel into the compressed air stream. The compressed air and fuel is then ignited by a burner causing rapid expansion. The expanding air from the combustor section flows through the turbine section causing rotationally mounted turbine blades to rotate and generate energy to drive the compressor section, among others. Again, the turbine section may include multiple stages to more efficiently extract energy from the airflow. The air exiting the turbine section is exhausted from the engine via the exhaust section, thereby creating thrust.

The output power of a gas turbine engine may be controlled by metering the fuel flow rate to the engine as well as the airflow into the engine. In particular, altering the airflow into the engine has a significant impact on the power and efficiency of the engine. In many applications, an engine controller monitors and controls the fuel delivery and airflow into the engine.

The airflow is typically adjusted by manipulating radial guide vanes near the inlet to the engine. For example, by altering the frontal area of inlet guide vanes and downstream stator vanes, the airflow into the engine can be varied between maximum and minimum airflow as needed depending upon the combustion conditions (e.g., air temperature, air density, engine load, and the like). By altering the frontal area of the vanes, the amount of air passing into the engine is controlled to optimize the combustion process given the current operating parameters.

Variable guide vanes, whether inlet guide vanes or stator vanes, are typically pivotally coupled to a unison ring, such that as the unison ring rotates, the guide vanes pivot uniformly. The guide vanes may be rotated between a closed position, in which airflow through the guide vanes and into the engine is substantially prevented, and an open position, in which airflow through guide vanes is substantially unrestricted. Additionally, the guide vanes may also be rotated to any number of orientations between the closed and open position, to more efficiently tune the combustion process.

Conventional gas turbine engines typically incorporate an electric motor or hydraulic system to actuate the adjustment of the variable vanes (e.g., inlet guide vanes, stator vanes, and the like). The motor(s) continue to move the actuators, unison ring, and thus guide vanes, until the guide vanes reach the position commanded by the controller. Position sensors supply position feedback signals representative of actuator position, and thus guide vane position, to the controller. When the position feedback signals indicate that guide vanes have reached the commanded position, the controller will de-energize the motor(s).

While these solutions may be appropriate for mainstream commercial aircraft operating at sub-sonic speeds below Mach 1 (i.e., approximately 761 miles per hour [1,024 kilometers per hour] at seal level at 59 degrees Fahrenheit [15 degrees Celsius]), the environment created by supersonic and hypersonic flight of manned or unmanned transport vehicles and missiles, or other air (or space) delivered weaponry, present significant new challenges to the actuation of turbine guide vanes. Typical solutions and designs are no longer applicable at these increased velocities. Additionally, other factors such as minimizing weight, controlling cost, extending range, and improving efficiency have an increased influence on the design.

To contextualize the extreme velocities in which the present invention can be suitably used, at 20,000 thousand feet above sea level, an aircraft traveling at Mach 5 is moving at approximately 3,500 miles per hour [approximately 5,600 kilometers per hour]—five times faster than an aircraft traveling at Mach 1 and approximately 55 times faster than an automobile on an interstate. At that rate, an aircraft could travel from New York, N.Y. to Los Angeles, Calif. in about 48 minutes. The extreme conditions cause materials to undergo considerable distortion that significantly complicates the design, construction, and operation of components of the aircraft.

This high rate of speed (i.e., near Mach 1 and faster) requires that the aircraft displace a considerable amount of air, which in turn, leads to a significant amount of friction, and thus, heat generated by the aircraft. Additionally, and especially at Mach 1 and greater, the aircraft locally compresses the air surrounding the aircraft, generating even more heat that is transferred to the components of the aircraft. An aircraft traveling at supersonic and hypersonic speeds can be operating at temperatures upwards of 1,200 degrees Fahrenheit [approximately 650 degrees Celsius].

In addition to the complications of extreme temperatures, significant vibrations and stresses are imparted to the aircraft at such high speeds (i.e., approaching Mach 1 and above). The amplitude and frequency of vibrations imparted to the components are more extreme than those imparted at sub-sonic speeds. Again, these vibrations and stresses are unique to the high speed environment and place increased demands on the design, construction, and operation of components of the aircraft.

Operating an aircraft, whether manned or unmanned, at supersonic and hypersonic speeds presents significant challenges in terms of the design, construction, and operation of the aircraft. Dynamic components used to control the operation of the engine, such as variable guide vane actuators, present an even more significant design challenge. Thus, a need exists for a variable guide vane actuator that is capable for use in the extreme environments of supersonic and hypersonic flight.

BRIEF SUMMARY

The disclosure provides a variable guide vane actuator (VGVA) for adjusting the inlet area of a gas turbine engine and can be configured to operate in the extreme environment created at velocities approaching or beyond Mach 1.

In one aspect, the disclosure provides an actuator for positioning guide vanes of a turbine engine. The actuator includes a housing defining a bore. A piston slideable in the bore has a head spaced from the housing bore and a rod extending from the head. A metallic head seal is mounted to the head to create a sliding seal against the housing bore, and a metallic rod seal is mounted to the housing to create a sliding seal against the rod. An output member is coupled to the piston.

The piston is disposed within the bore such that the piston position is independent of the position of the housing and the output member is moveable independent of the position of the housing such that the housing is substantially isolated from side loads acting on the piston and transferred to the piston head. The housing can also be cantilevered with respect to a support for mounting the actuator to the turbine engine to further aid in isolation of the actuator.

There can be multiple piston, bore and seal arrangements with the pistons linked by a coupler such that movement of the pistons occurs essentially simultaneously. The pistons each have a head spaced from its housing bore and a rod extending from the head with an associated metallic head seal mounted to the head to create a sliding seal against the associated housing bore and an associated metallic rod seal mounted to the housing to create a sliding seal against the associated rod.

The actuator can include a position sensor for sensing the position of the piston(s). A heat shield, which at least in part covers the position sensor, can be mounted to be movable with respect to the housing and translate with the piston. The position sensor can include an inner sleeve mounted to the housing by a retainer cap, and the inner sleeve can have a bore receiving an elongated probe mounted to the heat shield. The probe can be adjustably coupled to the heat shield. The heat shield can be cup-shaped and surround the retainer cap and inner sleeve. A separate link member can couple the heat shield to the piston.

The actuator can also include a valve coupled to the housing in fluid communication with an inlet for receiving working media. The valve controls the flow of the working media to the piston, and thereby the position of the actuator. The valve can also include a cooling circuit. The cooling circuit can include a collar having a coolant passage for passing coolant through the valve. More specifically, the coolant passage can be in part formed of a spiral groove in the collar. The collar can fit around an annular coil shell with a spindle about which an electromagnetic coil is wound. The groove in the collar can be open to the coil shell such that coolant in the coolant path directly communicates with the coil shell to cool the coil. In addition, the cooling circuit can be configured to extend proximate to the position sensor if present.

The valve can have a construction suitable for controlling flow of the working media in proportion to the input control signal to the valve. For example, the proportional valve can have an armature and opposed electromagnetic coil arrangements controlling the armature position such that the working media is metered to move the actuator piston(s) in proportion to the input signals. The armature can also be coupled to a clevis supported in a clevis cradle. The clevis can have a metering edge for controlling flow of a working media through an orifice in communication with the actuator piston.

In another aspect the disclosure provides an actuator for positioning guide vanes of a turbine engine in which the actuator includes: a valve for controlling flow of a working media, an actuator piston arrangement positioned by flow of the working media from the valve, a position sensor sensing the position of the actuator piston, and a heat shield at least in part covering the position sensor and linked to the piston to translate with the piston. The piston can have a head and a rod extending from the head with the head being spaced from its bore and metallic head and rod seals create sliding seals sealing off the working media.

In yet another aspect the disclosure provides an actuator for positioning guide vanes of a turbine engine in which the actuator includes: a valve for controlling flow of a working media, an actuator piston arrangement positioned by flow of the working media from the valve, and a position sensor sensing the position of the actuator piston. The valve can have a cooling circuit including a coolant passage formed by an annular groove in a collar disposed about an electrical component of the valve. The piston can have a head and a rod extending from the head in which the head is spaced from a bore of a housing and metallic head and rod seals create sliding seals sealing off the working media. And, the position sensor can be covered by a heat shield linked to the piston to translate with the piston.

These and other aspects and advantages of the disclosure will be apparent from the detailed description and drawings. What follows are one or more example embodiments. To assess the full scope of the invention the claims should be looked to, as the example embodiments are not intended as the only embodiments within the scope of the invention.

BRIEF DESCRIPTION OF THE DRAWINGS

FIG. 2 is a perspective view showing an exploded view of a piston of the example embodiment;

FIG. 3 is a perspective view showing a partial exploded view of a valve of the example embodiment;

DETAILED DESCRIPTION OF THE EXAMPLE EMBODIMENT(S)

A variable guide vane actuator (VGVA) for adjusting the inlet area of a gas turbine engine and is preferably configured to operate in the extreme environment of supersonic or hypersonic flight. The VGVA, however, is also suitable for operation at velocities below Mach 1, such as reached in conventional aircraft. Additionally, while the example embodiment is described in relation to an unmanned aircraft or flight vehicle, the VGVA is equally applicable to manned flight vehicles, such as planes and helicopters.

The example embodiment will be described with reference to a missile developed in connection with the Revolutionary Approach To Time-critical Long Range Strike (RATTLRS) program led by the Office of Naval Research and supported by the United States Army and the National Aeronautics and Space Administration (NASA), among others. As a result, the VGVA is capable of operation in extreme environments associated with high velocity travel (i.e., exceeding Mach 1), minimizes cost and weight, and improves efficiency and dependability over previous solutions.

Figure 1:
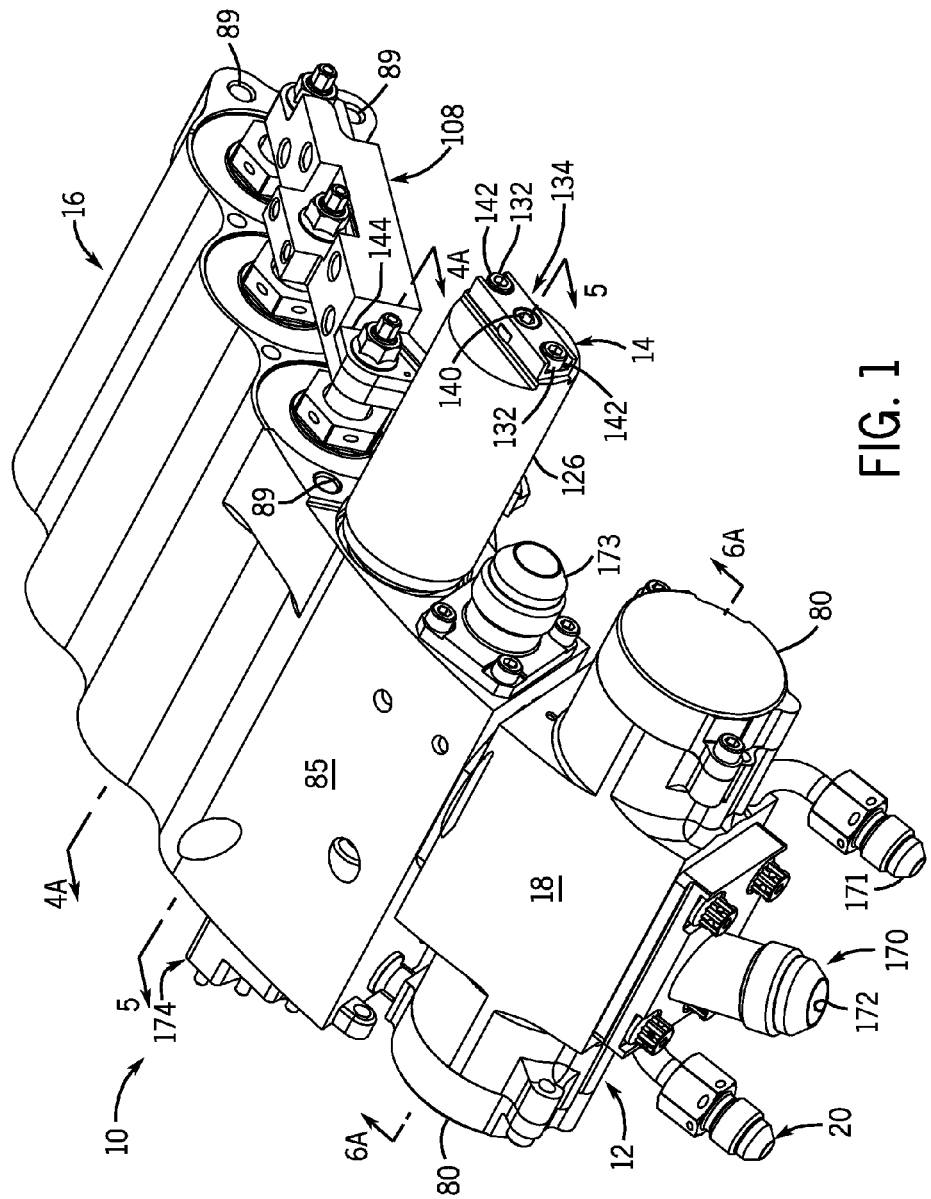
FIG. 1 is a perspective view of a variable guide vane actuator in accordance with an exemplary embodiment.

Looking first to FIG. 1, a variable guide vane actuator (VGVA) 10 in accordance with an example embodiment of the present invention is shown. The VGVA 10 includes three main sections, namely, a proportional valve 12, a position sensor 14, and an actuator 16. In the example embodiment, the sections act in unison to adjust variable inlet guide vanes and variable first stage stator vanes of a gas turbine engine (collectively variable vanes). Notably, other variable guide vanes could be adjusted when present.

In general, the proportional valve 12, a pulse width modulated (PWM) valve in the example embodiment, proportionally meters the flow of a working fluid to the actuator 16, such as compressor exhaust air, in response to an input from a controller (not shown). The position sensor 14, for example, a linear variable displacement transducer (LVDT), detects the position of the actuator 16 and thus the orientation of the variable vanes. As a result, the position of the variable vanes is adjusted as the proportional valve 12 meters the flow of working media to the actuator 16 based upon input signals from the controller taking into consideration the position of the actuator 16 as determined by the position sensor 14.

While not shown, the VGVA 10 of the example embodiment is housed adjacent the engine and is subjected to ambient temperatures in excess of 800 degrees Fahrenheit [approximately 426 degrees Celsius] due in part to the extreme conditions created by velocities approaching and exceeding Mach 1, and typically greater than Mach 3. Additionally, heat is transferred to the VGVA 10 when the exhaust gas is used as the working media to operate the actuator 16. As one example, the exhaust gas can have a temperature greater than 1,200 degrees Fahrenheit [approximately 648 degrees Celsius] and at a pressure of less than 500 pounds per square inch gage [approximately 3,400 kilopascal]. Using this high temperature, low pressure exhaust gas as the working media results in several unique features, described below.

The general operation of the VGVA 10 will be described by tracing the path of the working media, here the exhaust gas, through the VGVA 10. Next, the removal of heat from portions of the VGVA 10 will be described. Lastly, a schematic will illustrate a system using the VGVA 10 of the example embodiment to position guide vanes of a turbine engine.

The proportional valve 12 can utilize compressor discharge air as the working media to effect the movement of the actuator 16; as mentioned however, gas turbine exhaust and the like may also be used as the working media. It is of note that alternative working media may be incorporated without exceeding the scope of the present invention; while the use of compressor discharge or exhaust has required inventive solutions, the resulting invention is equally applicable to more conventional working fluids, such as, hydraulic fluid, combustion fuel, and the like.

Figure 7:
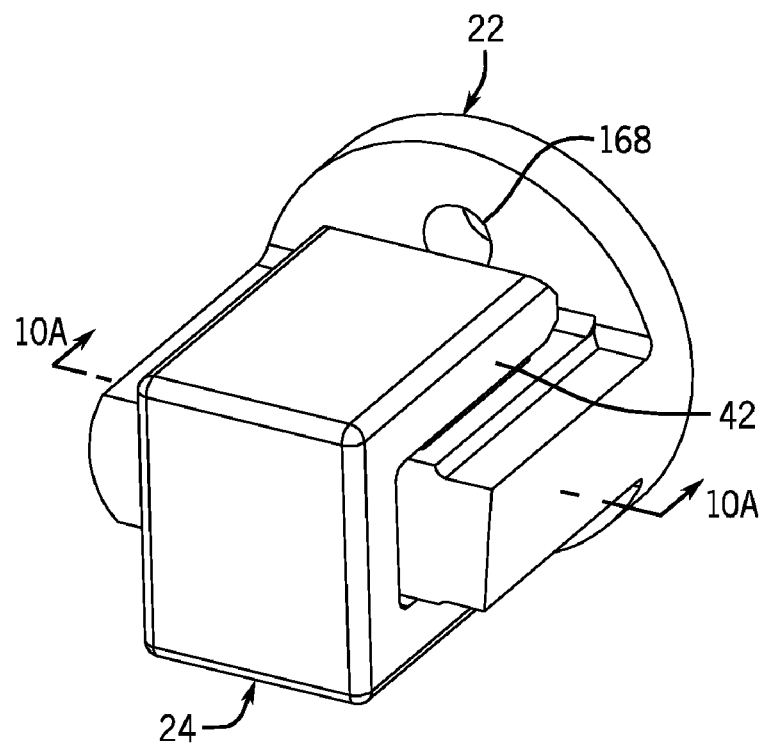
FIG. 7 is a detailed perspective view showing a four-way valve and clevis arrangement in the hold/no-flow position.
Figure 8:
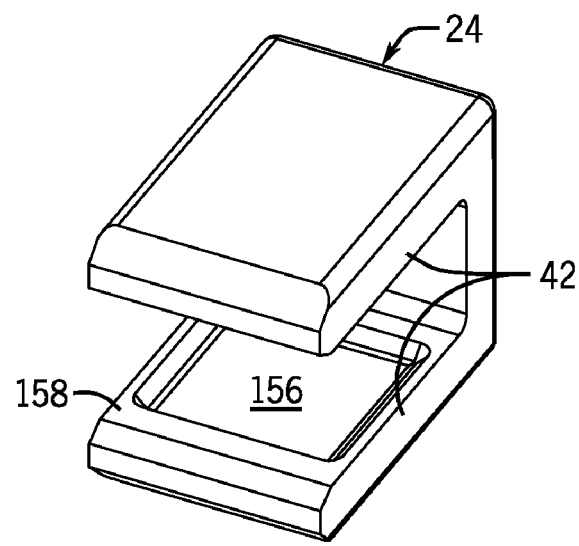
FIG. 8 is a perspective view of the clevis of FIG. 7.
Figure 9:
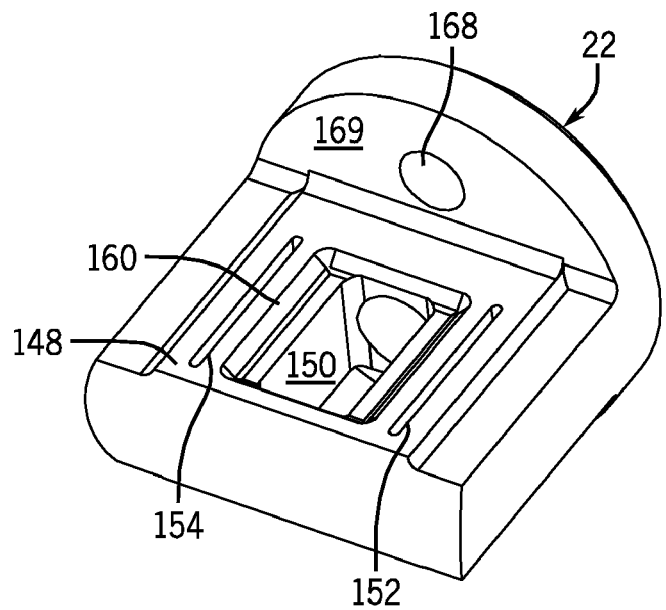
FIG. 9 is a perspective view of the four-way valve shown in FIG. 7.

Continuing to reference FIG. 1, compressor discharge air enters the valve body 18 via inlet 20. The working media (e.g., compressor discharge air, exhaust, and the like) flows to a centralized four-way valve 22 and clevis 24 arrangement (shown in detail in FIGS. 7, 8, and 9). Turning to FIG. 3, the four-way valve 22 is coupled to a valve base 26, with the aid of alignment hole 168 and alignment pin (not shown) in the valve base 26, that is inserted into a valve cavity (not shown) formed in the valve body 18 and sealed by a pair of o-rings 30. The four-way valve 22 and clevis 24 are inserted into the clevis cradle 32 where a clevis spring 34 biases the clevis 24 with respect to the four-way valve 22. Given the high temperatures of the working media, the four-way valve 22 and clevis 24 are preferably made of Haynes 6B, manufactured by Haynes International, Inc., Kokomo, Ind., U.S.A., because of its superior strength and durability at elevated temperatures. The valve body 18 is preferably made of less costly 316L stainless steel, due to slightly reduced temperature realization and lessened need for dimensional control.

In operation, the clevis 24 is translated along a valve axis 36 by a pull-pull type electromagnetic coil arrangement 38, while the four-way valve 22 remains stationary with respect to the valve body 18. With reference to FIG. 3, one portion of the coil arrangement 38 is shown exploded from the valve body 18; the unexploded side is substantially similar.

The clevis cradle 32 is substantially rectangular having an opening receiving the clevis spring 34, clevis 24, and the four-way valve 22. The clevis spring 34 helps seat the clevis 24 to the four-way valve 22. The clevis cradle 32 includes two pair of offset engagement tabs 40 that are designed to abut the U-shaped side walls 42 of the clevis 24 resulting in the clevis 24 translating in unison with the clevis cradle 32. The clevis cradle 32 is preferably manufactured from Haynes 188 because of its high strength and thermal compatibility with the valve body 18.

Figure 6A:
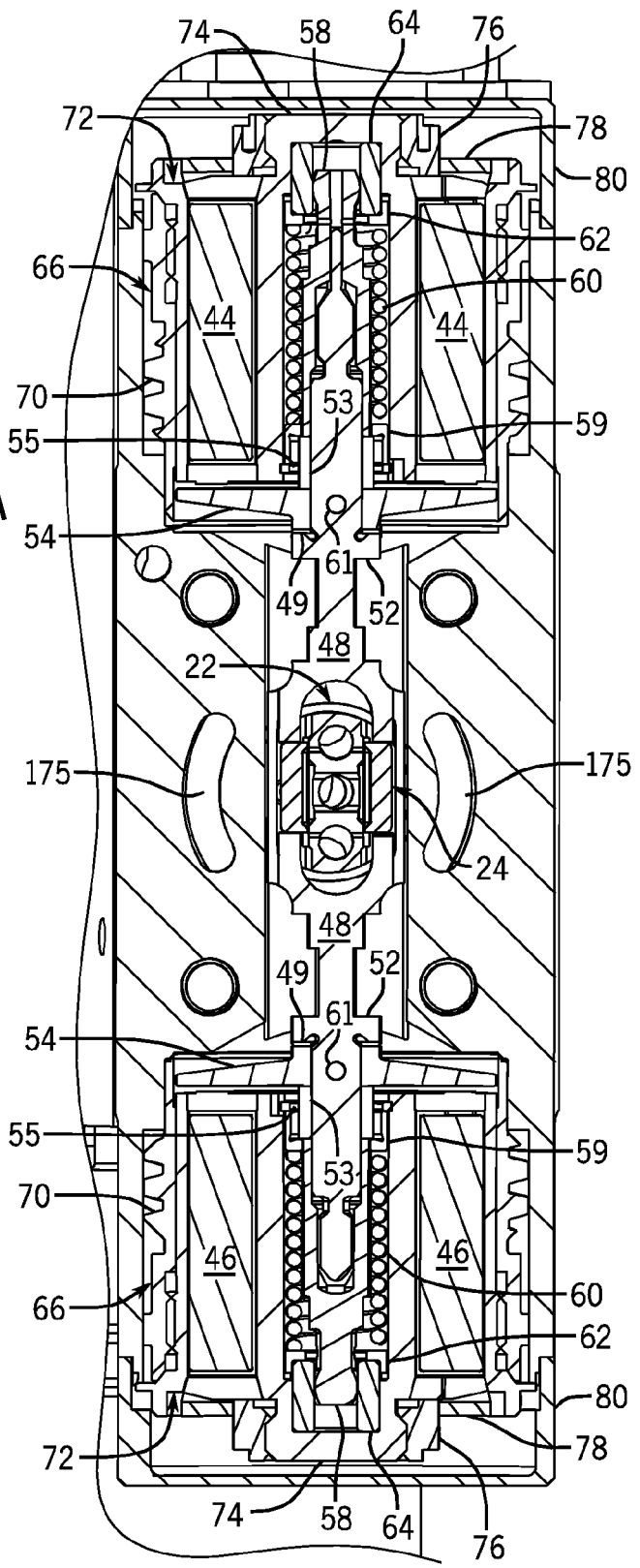
FIG. 6A is a partial section view of a valve along line 6A-6A of FIG. 1 showing the valve in the retracted position.
Figure 6B:
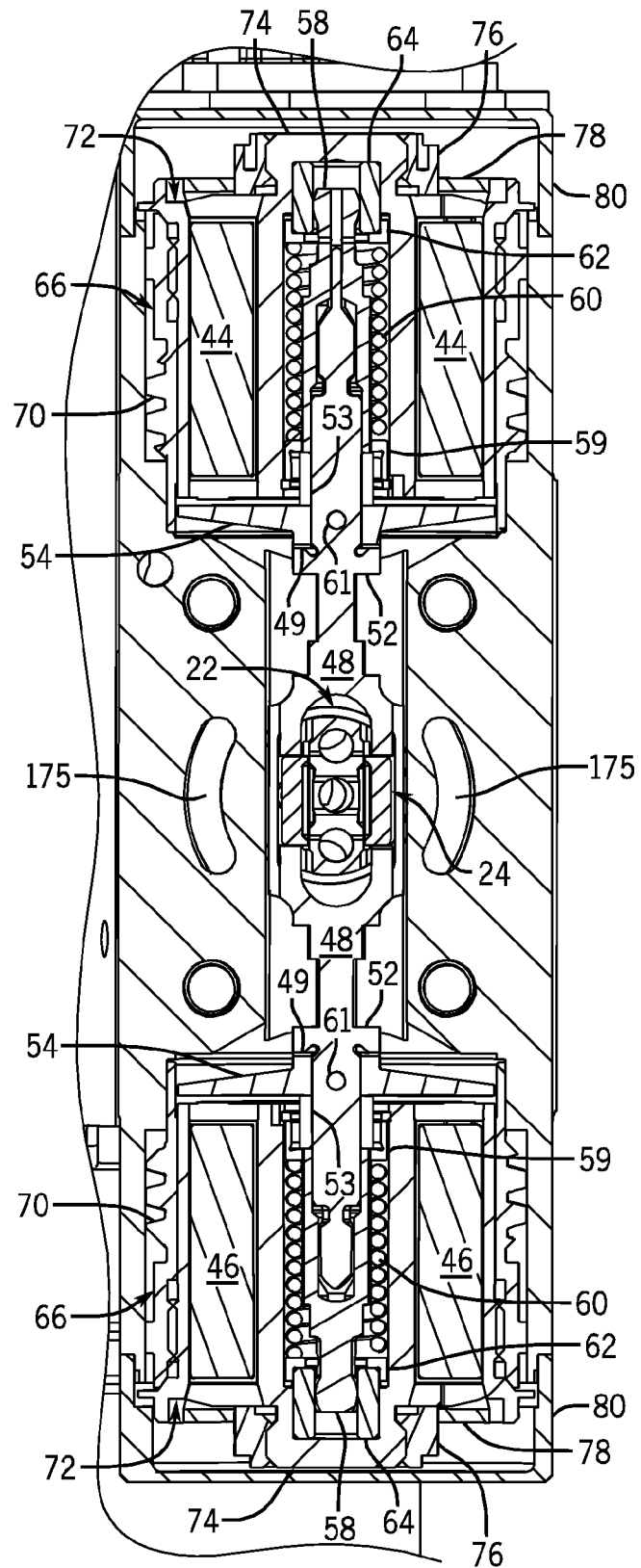
FIG. 6B is a partial section view similar to 6A showing the valve in the extended position.

With specific reference to FIGS. 3, 6A, and 6B, the clevis cradle 32 is proportionally translated along the valve axis 36 in response to the energizing of a retraction coil 44 and an extension coil 46. An actuator rod 48 extends normal to the longitudinal side 50 of the clevis cradle 32. The actuator rod 48 includes a flange 52 to which a washer 49 and disc-shaped clapper 54 abuts after the clapper 54 is slid along the actuator rod 48. The clapper 54 includes an alignment hole 56 for engaging a mating alignment pin 57 in the proportional valve body 18. Additionally, a pin 51 extends through hole 61 formed in the actuator rod 48 and is seated in a mating recess 63 formed at the center of the clapper 54.

A spacer 53 is captured along with the clapper 54 between an alignment rod 58 that is axially aligned with and threaded onto the actuator rod 48. A first spring retainer 59, a c-clip 55 and a coil spring 60, providing a biasing force during operation, are axially aligned with the alignment rod 58. A second spring retainer 62 and bushing 64 are axially aligned with the alignment rod 58 at the opposite end of the spring 60. The controller is configured to operate the proportional valve 12 in connection with numerous inputs, including the coil springs 60. Due to the high temperatures the actuator rod 48 and alignment rod 58 are exposed to during operation, each component is preferably made from Haynes 188, manufactured by Haynes International, Inc., Kokomo, Ind., U.S.A.

Next, a cylindrical coolant collar 66 is brazed into a mating opening 68 formed in the valve body 18. The collar 66 includes radial grooves 70 for directing a coolant media around the periphery of the coil arrangement 38 (described in detail below). The collar 66 is preferably made from 316L ORES stainless steel to provide sufficient heat transfer to the coolant media circulated in the radial grooves 70. A shell 72 is axially aligned with the valve axis 36 and partially inserted into the interior of the collar 66. The shell 72 includes an interior spindle 74 for aligning the retraction coil 44. The retraction coil 44 encircles the actuator rod 48 and alignment rod 58 (generally an armature) such that when the retraction coil 44 is energized, the retraction coil 44 urges the clapper 54 and clevis 24 and armature toward the retraction coil 44. A retainer nut 76 abuts the end of the retraction coil 44 and is adjacent a disk-shaped coil retainer 78. Lastly, an end cap 80 covers the coil arrangement 38 and is held in place via cap screws 82. The end cap 80 provides added protection to the interior components and is preferably made from 316 ORES stainless steel.

A similar coil arrangement 38 is housed at the opposite end of the proportional valve 12, but an extension coil 46 (shown in FIG. 6A and FIG. 6B) is used to urge the clevis 24 and armature toward the extension coil 46.

As the pressurized working media is metered to the VGVA 10, the working media is routed to either extend or retract the actuator 16, such as from a first position to a second position, thereby ultimately adjusting the variable guide vanes. The relatively low pressure and velocity of the working media, here the compressor discharge air, was overcome by incorporating multiple bores and pistons linked together. A portion of the actuator 16 will be described with the understanding that the remaining portions are similar. Additionally, depending on the application requirements and restrictions, more or less bores and pistons could be incorporated to obtain the desired result.

Turning first to FIG. 2, the actuator 16 includes a bore 84 formed in a housing body 85. Additional bores are formed parallel to the bore 84 such that linear movement of each bore is along parallel offset axis. The actuator 16 further includes a piston 86 having a disc-shaped head 88 disposed at one end of the piston 86. The head 88 includes an annular groove 90 formed in a circumferential wall 92 of the head 88. A seal 94 is seated in the groove 90 such that the seal 94 abuts the interior wall 96 of the bore 84 during operation to prevent the working media from passing by the seal 94 despite the extreme temperatures and intense vibrations. The seal 94 is made of carbon for the seal 94 is required to operate in excess of 1200 degrees Fahrenheit.

The actuator 16 and associated bores 84 and pistons 86 are not cooled by a coolant media, as a result, given the extreme temperatures (in excess of 1,200 degrees Fahrenheit [approximately 600 degrees Celsius]) galling and seizing of the piston 86 within the bore 84 is a continuous concern. To minimize this concern, the piston 86 is uniquely positioned within the bore 84 such that the piston 86 floats within the bore 84. Furthermore, the head 88 is undersized in the bore so as to not make direct contact with the interior wall 96 of the bore 84. The risk of galling is reduced along with the frictional resistance impeding the actuator 16. To seal the relatively large gap between the head 88 of the piston 86 and the interior wall 96 of the bore 84, the unique, high temperature seal 94 was implemented, providing a low friction seal.

The piston 86 includes a rod 87A normal to the head 88 that extends though a central opening 98 in a disc-shaped retainer seal 100. A rod seal 102 is then slid over the rod 87A and captured between the retainer seal 100 and a piston retainer 104. The rod seal 102 is made of carbon, similar to the seal 94.

As a result of the floating piston 86, the undersized head 88 spaced from the bore 84, the seal 94 around the head 88, and the rod seal 100 about the rod 87A, side load forces applied to the piston 86 are not transferred to the bore 84 of the actuator 16. Thus, potential galling between the piston 86 and bore 84 is eliminated and the amount of actuator 16 friction is significantly reduced.

The end of the rod 87A continues to extend through a mating hole 106 formed in a coupler 108. The coupler 108 links the rods 87A, 87B, 87C such that when the proportional valve 12 meters the working media to the actuator 16, each rod 87A, 87B, 87C moves substantially in unison, thereby coupling the force produced by each. The pistons 86 and the coupler 108 are preferably made of A 286 ORES stainless steel because of the rigidity and strength required of the pistons 86 and coupler 108 during operation of the VGVA 10.

Figure 11:
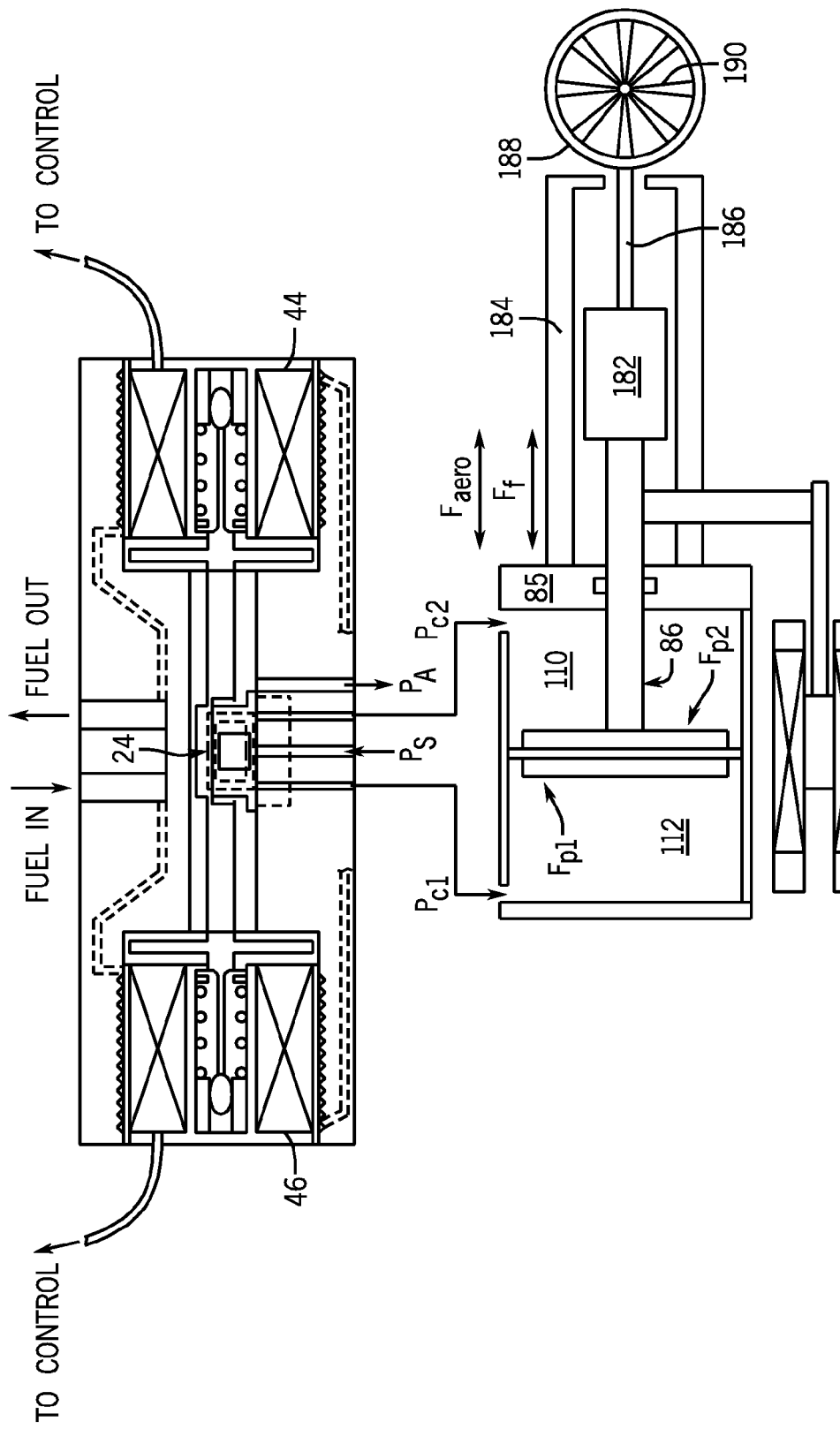
FIG. 11 is a schematic diagram illustrating a system for controlling the guide vanes of a turbine engine using the actuator of the example embodiment of the present invention.

The pistons 86 are attached to a common coupler 108, which also acts as the piston 86 interface to an engine mounted cam mechanism (see FIG. 11). A portion of the cam mechanism engages the unison ring that in turn alters the input area of the gas turbine engine by varying the positioning of the variable guide vanes from a first position to a second position. The coupler 108 uses the additional stiffness of the cam mechanism to reduce the deflection of the piston 86 within the housing body 85 due forces created during flight, such as shock and vibration loads. The cantilevered mounting of the housing body 85 to the cam mechanism of the engine (not shown) at the four mounting locations 89 allows the housing body 85 (preferably made of 316L stainless steel) to undergo thermal expansion and contraction in a direction away from the cam mechanism, thereby minimizing side loading and binding of the pistons 86 and allowing for a precise mechanical fit between the housing body 85, thus actuator 16, and the engine/cam mechanism. The mounting configuration prevents the components from distorting, twisting, and effectively eliminates side loads imparted to the piston 86 from being transferred to the bore 84.

While both the housing body 85 and coupler 108 are engaging the cam mechanism, the housing body 85 is mounted to a different component of the cam mechanism than the coupler 108. The coupler 108 is rigidly affixed to a cam plate (see FIG. 11). The cam plate is then captured in a cam guide, allowing the cam plate to undergo linear movement. The housing body 85 is rigidly affixed to the cam guide. The required precise alignment between the piston 86 and the housing body 85 requires very tight control of the mechanical interfaces between the components of the cam mechanism and the two interfaces with the actuator 16 (i.e., the connection between the coupler 108 and the cam plate captured in the cam guide and the housing body 85 affixed to the cam guide).

Figure 4A:
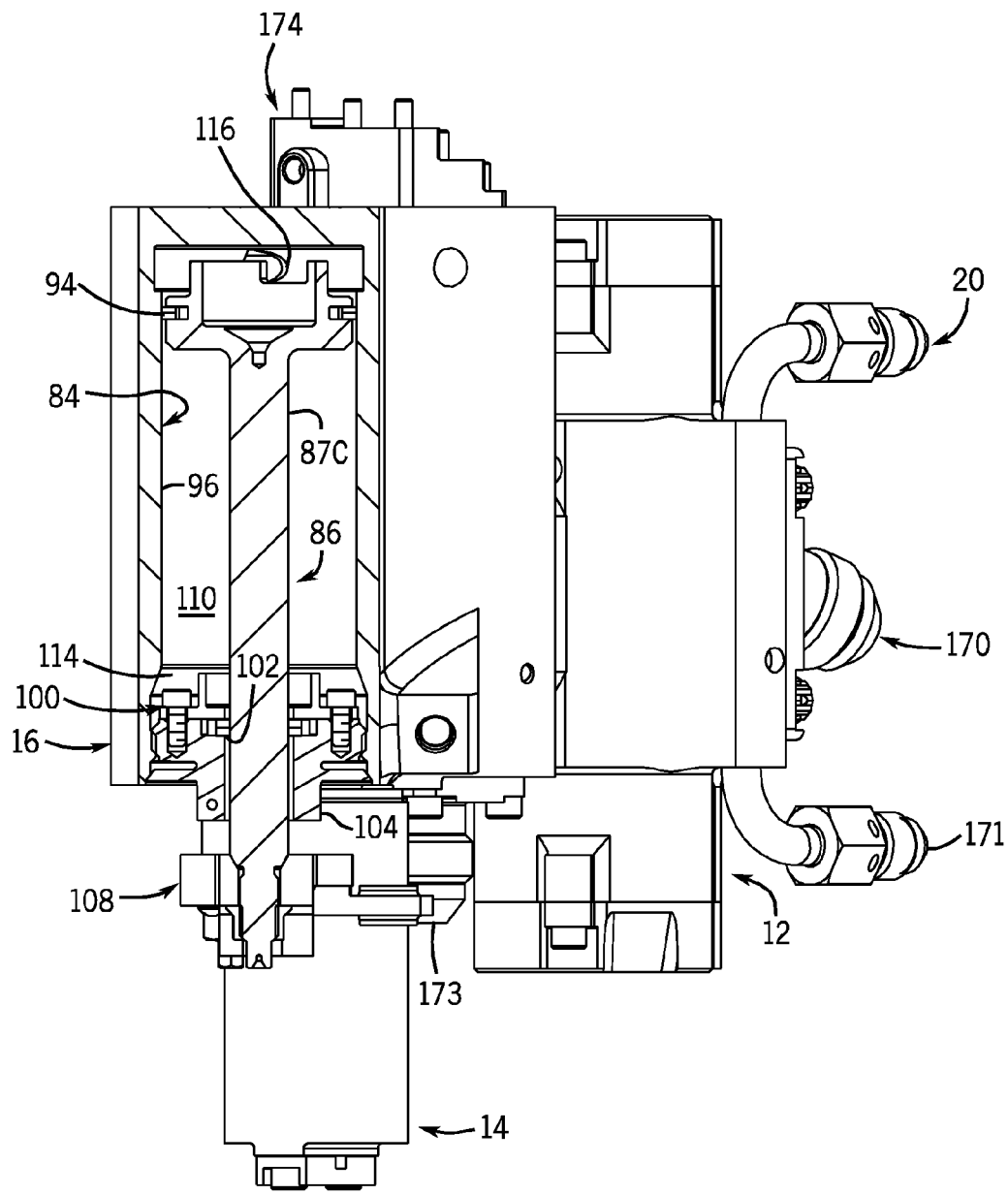
FIG. 4A is a section view of a piston along line 4A-4A of FIG. 1 showing the piston in the retracted position.
Figure 4B:
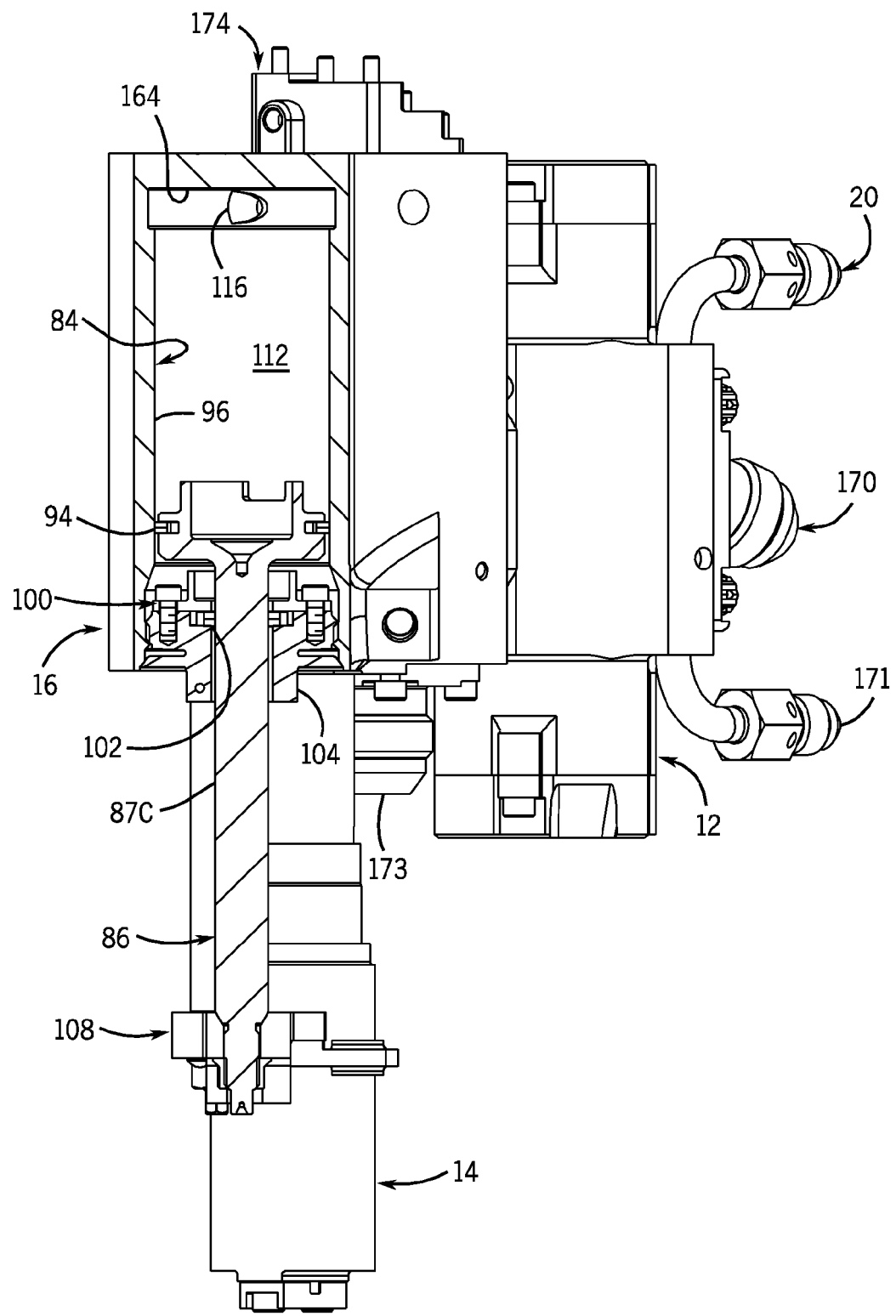
FIG. 4B is a section view similar to FIG. 4A showing the piston in the extended position.

Turning briefly to FIGS. 4A and 4B, the head 88 of the piston 86 defines a retraction chamber 110 and an extension chamber 112. Pressurized working media (e.g., exhaust, compressor discharge) is metered into the retraction chamber 110 and extension chamber 112 via a retraction control passageway 114 and extension control passageway 116, respectively, to move the piston 86 from a first position to a second position (not necessarily at the extremes of piston 86 travel). The flow of working media is dependent on the desired direction of piston 86 travel, and thus coupler 108 travel, as determined by the controller. The control of the actuator 16 will be discussed in more detail below.

Figure 5:
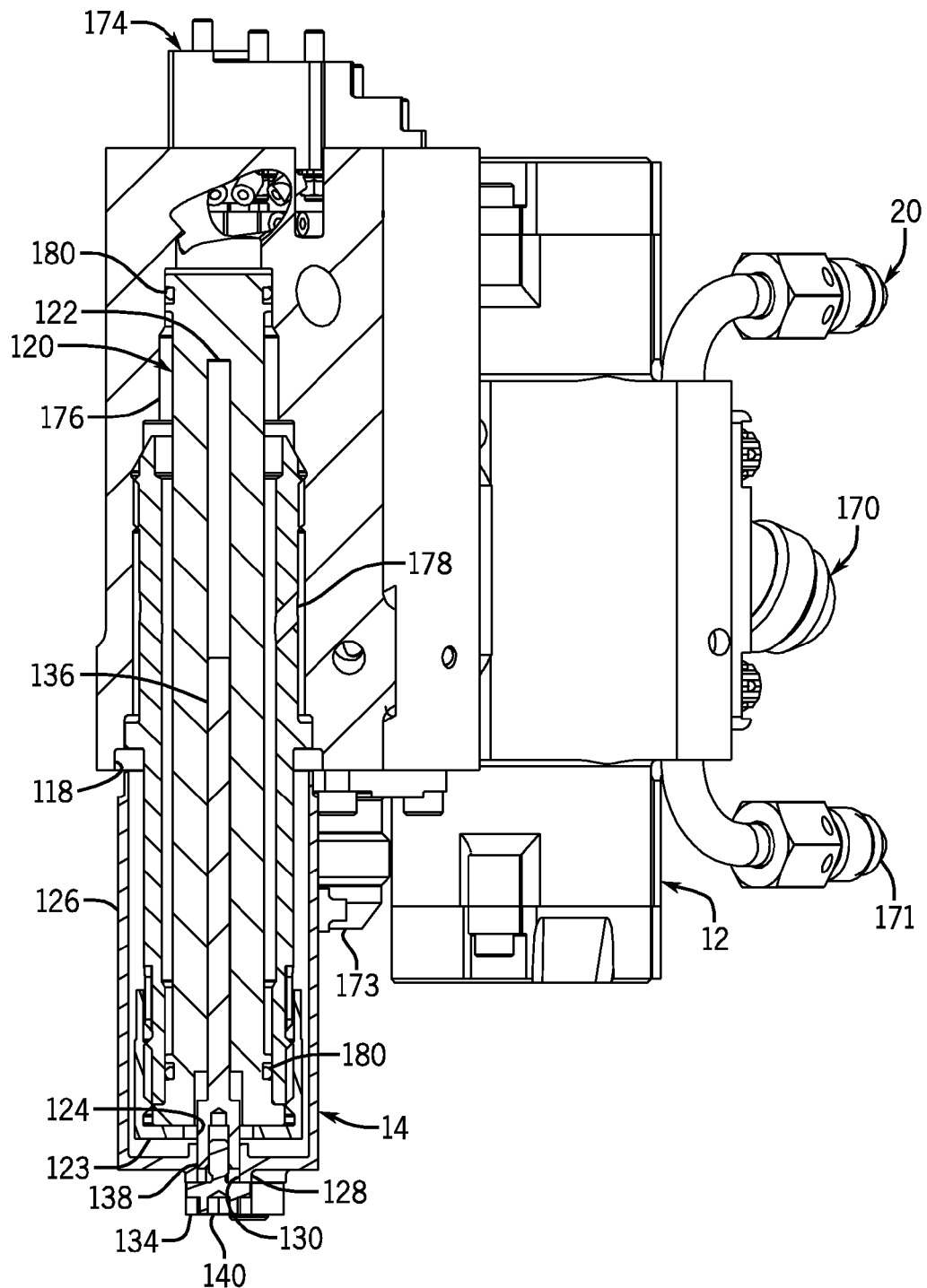
FIG. 5 is a section view of a position sensor along line 5-5 of FIG. 1.

The position sensor 14 is used to sense the movement and location of the coupler 108 as the actuator 16 moves between and within the retracted and extended positions, as shown in FIGS. 4A and 4B. Turning to FIGS. 1 and 5, in the example embodiment, the position sensor 14 is a linear variable differential transformer (LVDT). The location of the LVDT was such that it provides precise position feedback and allows for the necessary cooling of its temperature sensitive components via a coolant media (e.g., fuel). However, while an LVDT type position sensor 14 was most appropriate for the example embodiment, many other types of position sensors are available and may be used where the application requirements permit.

The position sensor 14 is coupled to the housing body 85 and extends into a cavity 118 formed in the housing body 85. The position sensor 14 includes an inner stationary sleeve 120 defining a central bore 122. A retainer cap 123 captures the sleeve 120 to the housing body 85. The retainer cap 123 includes a hole 124 axially aligned with the bore 122. A cup shaped heat shield 126 is slid over the sleeve 120; the heat shield 126 is used in combination with a coolant media (e.g., gas turbine engine fuel) to remove heat from the position sensor 14 and the associated electronics. The heat shield includes a raised ridge 128 having a central hole 130 and a pair of spaced apart mounting holes 132. A spacer 134 includes three mating holes and is aligned with the holes 130, 132 of the heat shield 126 to secure a rod shaped probe 136 into the bore 122. The probe 136 extends through the central hole 130 and partially into the bore 122. The exterior end of the probe 136 includes a threaded hole 138 for receiving an adjustment screw 140. The adjustment screw is used to fine tune the placement of the probe 136 within the bore 122 for precise control of the actuator 16 and associated pistons 86. Lastly, two cap screws 142 secure the spacer 134 to the heat shield 126.

In order for the position sensor 14 to sense the position and movement of the actuator 16, more specifically the position and movement of the pistons 86, a J-shaped link 144 provides communication between the coupler 108 and the position sensor 14. One end of the link 144 is captured to the coupler 108 (as shown in FIG. 1) and the opposite end is preferably brazed to the heat shield 126, and thus coupled to the probe 136. As the actuator 16 extends and retracts, the heat shield 126 and probe 136 translate accordingly, effectively monitoring the position of the coupler 108. The position sensor 14 communicates the sensed position to the controller so that it can be factored into the controller logic.

With the general structure and operation of the main components of the VGVA 10 described, a more detailed discussion of the operation of the VGVA 10 follows. Returning to FIG. 1, a working media, such as the exhaust from a gas turbine engine or the discharge air from the compressor, is supplied to the inlet 20. The working media is channeled into the proportional valve body 18 where it engages the four-way valve 22 and clevis 24 (shown in isolation in FIG. 3). Because of the relatively low pressure and velocity of the working media, here the compressor discharge air, the proportional valve 12 is mounted directly to the actuator 16 to reduce the pressure drop created as the working media flows within the VGVA 10.

Figure 10A:
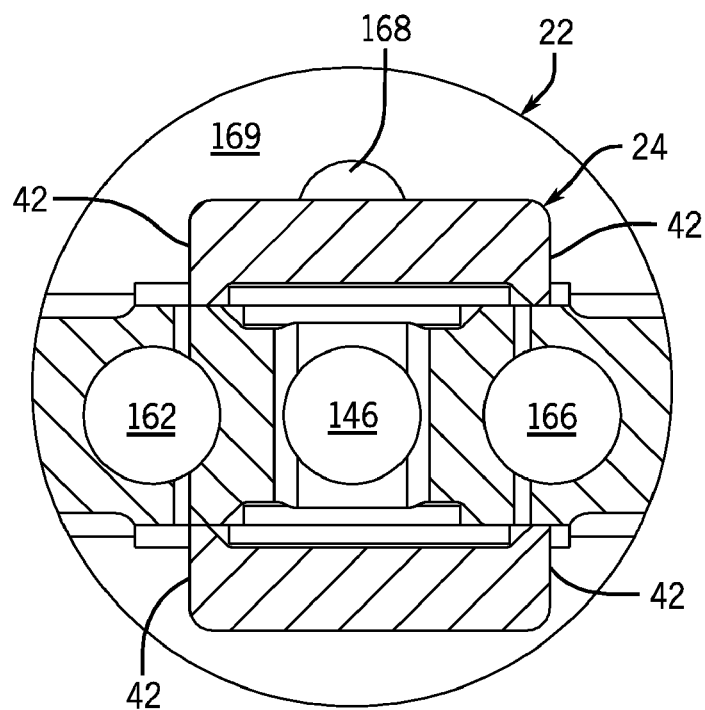
FIG. 10A is a partial section view along line 10A-10A of FIG. 7 showing the clevis in the retraction position.
Figure 10B:
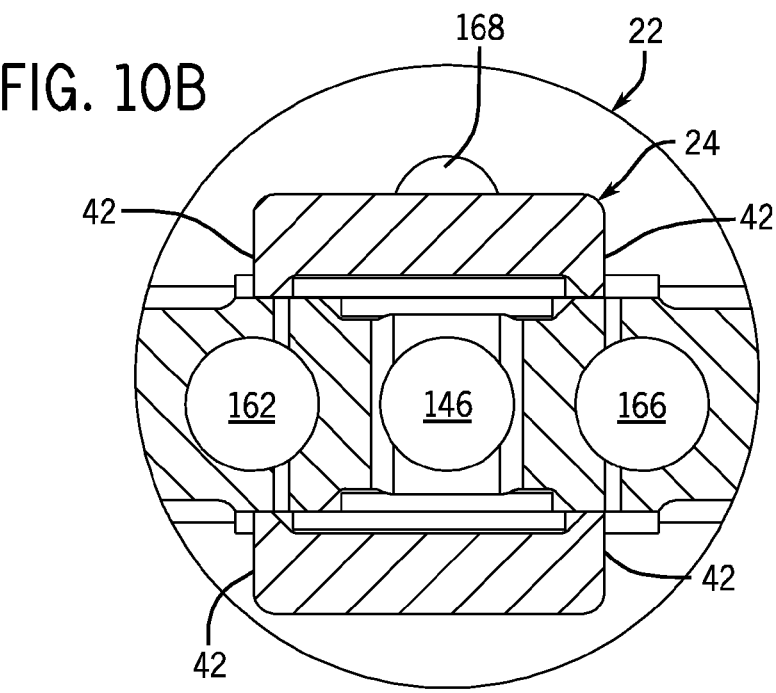
FIG. 10B is a partial section view similar to FIG. 10A showing the clevis in the extension position.
Figure 10C:
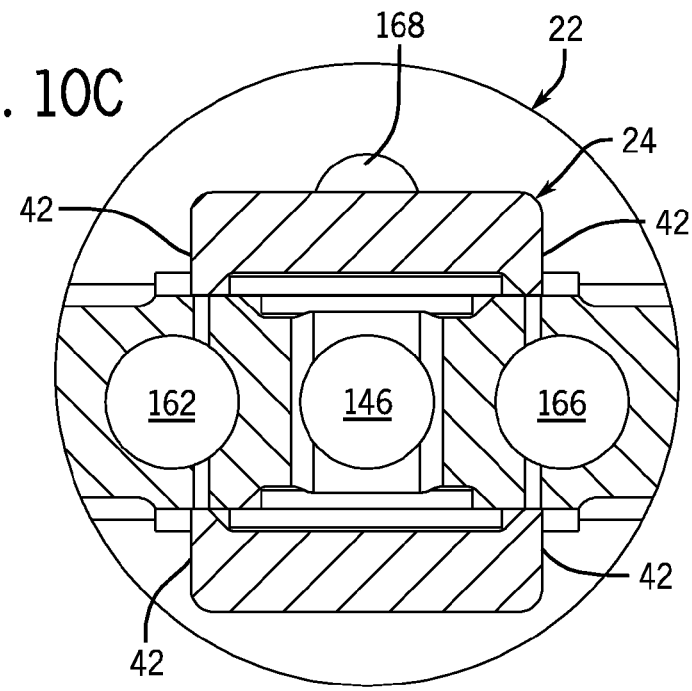
FIG. 10C is a partial section view similar to FIG. 10A showing the clevis in the hold/no-flow position.

With reference to FIGS. 10A, 10B, and 10C, the inlet 20 leads to a central supply port 146 or orifice formed in the center of the four-way valve 22. The four-way valve 22 is best illustrated in isolation in FIG. 9 and the clevis 24 in FIG. 8. The four-way valve 22 includes a pair of offset sealing faces 148 and a central passage 150 extending between the sealing faces 148. Additionally, a retraction slit/orifice 152 and an extension slit/orifice 154 are formed between the sealing faces 148 allowing the working media to flow through the four-way valve 22 when the working media is in fluid communication with either the retraction slit 152 or the extension slit 154. Air discharged from the 4-way valve, while controlling the actuator 16, is vented to the internal cavity of the valve housing 18, which is in communication with the working media outlet 171.

Energizing the retraction coil 44, the extension coil 46, or some combination thereof, of the proportional PWM valve 12 results in the clevis 24 translating with respect to the four-way valve 22 and adjusting the actuator 16 from a first to a second position. The controller energizes the electromagnetic coils 44, 46, and in combination with the springs 60, to control the position of the clevis 24, in turn metering flow to the actuator 16.

Turning to FIG. 10C, the clevis 24 is shown in the hold or no-flow position. In this position, the working media is pressurized at the supply port 146 allowing the working media to flow into the passage 150 and recesses 156 formed in the clevis 24. However, the sealing face 158 of the clevis 24 seals against the sealing face 148 of the four-way valve 22, preventing the supply port 146 from being in fluid communication with any other port 162, 166. As a result, the actuator 16 and coupler 108 remain substantially stationary, but for the compressibility of the working media in response to forces applied to the coupler 108 via the variable guide vanes (e.g., aerodynamic forces on the vanes transferred to the unison ring, through the cam linkage, and influencing the coupler 108).

Turning to FIGS. 6B, 10B, and 4B, to extend the actuator 16 and attached coupler 108, the extension coil 46 is energized causing the clevis 24 to shift to the position shown in FIG. 6B and, more clearly, FIG. 10B. With the extension coil 46 energized, the supply port 146 is in fluid communication with the extension port 162. The extension port 162, in turn, is in fluid communication with the extension control passageway 116 that directs the working media into the extension chamber 112 causing the piston 86 and associated coupler 108 to extend (shown in FIG. 4B). The extension control passageway 116 communicates with all of the extension chambers 112 (one for each piston 86 and bore 84 pairing) proximate the extension chamber base wall 164. The seal 94 prevents the working media from bypassing the head 88. At the same time, the retraction port 166 enters into fluid communication with the working media outlet 171 so that any working media in the retraction chamber 110 is vented to the atmosphere and thus provides little resistance to movement of the actuator 16.

Turning to FIGS. 6A, 10A, and 4A, to retract the actuator 16 and attached coupler 108, the retraction coil 44 is energized causing the clevis 24 to shift to the position shown in FIGS. 6A and, more clearly, 10A. With the retraction coil 44 energized, the supply port 146 is in fluid communication with the retraction port 166. The retraction port 166, in turn, is in fluid communication with the retraction control passageway 114 and the working media is directed into the retraction chamber 110 causing the piston 86 and associated coupler 108 to retract (shown in FIG. 4A). The retraction control passageway 114 communicates with all of the retraction chambers 110 (one for each piston 86 and bore 84 pairing) proximate the retainer seal 100. Again, the seal 94 prevents the working media from bypassing the head 88. At the same time, the extension port 162 enters into fluid communication with the working media outlet 171 so that any working media in the extension chamber 112 is vented to the atmosphere and thus provides little resistance to movement of the actuator 16.

The four-way valve 22, as shown in FIGS. 9, 10A, 10B, and 10C, includes multiple metering faces 160 that gradually allow the pressurized working media from the supply port 146 to enter into the respective extension slit/orifice 154 or retraction slit/orifice 152 depending on the direction of clevis 24 travel.

While the use of compressor discharge or engine exhaust as the working media has the benefit of not requiring an additional fluid source, the extreme temperature of the compressor discharge air or gas turbine exhaust requires that the proportional valve 12 and position sensor 14 include some type of cooling scheme. Thus, the proportional valve 12 includes a coolant media inlet 170 defining a passageway 172 into the proportional valve body 18. With reference to FIGS. 3, 6A, and 6B, the passageway 172 leads to the grooves 70 formed in the coolant collar 66. The coolant media, here the liquid fuel for the gas turbine engine, is circulated in the passageway 172 prior to combustion in the engine about both the extension coil 46 and the retraction coil 44.

Given the hot environment in which the proportional valve 12 was designed to operate, active cooling (i.e., using liquid fuel) was chosen as the means to reduce the local operating temperature of the retraction coil 44 and the extension coil 46. One hundred percent of burn flow (from engine start to maximum speed) is used to remove heat from the temperature sensitive components of the proportional valve 12. To minimize the pressure increase to the fuel system coupled to the coolant media inlet 170, a unique low pressure-drop coolant media passageway 172 was incorporated through the proportional valve 12. Even though the configuration of the fuel management system prevents the use of system fuel pressure as the motive force for this actuator 16, the fuel is still suitable for use as a coolant media.

The position sensor 14 further includes an internal passageway 176 extending around the periphery of the sleeve 120 through a passage 178. The coolant media is restrained by a pair of o-rings 180 disposed proximate the ends of the sleeve 120. Coolant media is circulated through the coolant media inlet 170, through the coolant passageways 172, 175 and about the sleeve 120 to extract heat from the position sensor 14, thus ensuring the temperatures sensitive components operate as intended. The coolant media is then directed to the coolant media outlet 173 where, in the present invention, it rejoins the fuel supply.

By utilizing active cooling, the design of the proportional valve 12 and position sensor 14 allowed for use of less exotic materials, more economic materials, such as 316L stainless steel—ideal where the application is an expendable missile.

The electrical connections are described with reference to FIGS. 1, 4A, 4B, and 5 depicting the terminal block 174 mounted to the housing body 85. Supply power is applied to the terminal block 174 by the controller, to selectively activate the retraction coil 44 and the extension coil 46, and power the position sensor 14. Additionally, the feedback from the position sensor 14 is output to a controller (not shown) programmed to energize the retraction coil 44 and extension coil 46 based on a variety of inputs and predetermined control logic. For example, the controller may be monitoring the engine load, air temperature, and a variety of other factors, to determine the appropriate positioning of the variable guide vanes (e.g., inlet guide vanes and first stage stator vanes). Should the controller determine that an adjustment of the variable guide vanes is necessary, the controller sends signals to energize the coils 44, 46 in proportion to the desired actuation of the guide vanes to move the guide vanes from a first to a second position. The controller adjusts the proportional valve 12 to operate at a maximum of approximately 60 hertz.

The control and operation of the VGVA 10 are illustrated in the system shown in FIG. 11. First, an abbreviated coolant media passage is depicted spiraling about the extension coil 46 and the retraction coil 44. The coils 44, 46 are operationally coupled to a controller (not shown); the controller proportionally adjusts the position of the piston 86 based on multiple inputs and predefined control logic.

In operation, actuating the extension coil 46 results in the clevis 24 sliding left (as shown in FIG. 11). As a result, the supply pressure (Ps) flows into the extension chamber 112 via the extension control passageway 116 (Pc1) and creates a force (Fp1) on the piston 86, urging the piston 86 to extend rightwards. At the same time, the retraction control passageway 114 (Pc2) is moved into fluid communication with ambient (Pa), thus allowing the working media to flow out of the retraction chamber 110 minimizing the resistive force (Fp2). The force (Fp1) on the piston 86 must overcome both the frictional forces (Ff) and the aerodynamic forces (Faero) created by the variable guide vanes. The piston 86 is coupled to the position sensor 14 that monitors and communicates the position of the cam plate 182 attached to the end of the piston 86 to the controller.

The cam plate 182 is captured in a cam guide 184 mounted to the housing body 85. The cam plate 182 influences a cam linkage 186 that is in turn coupled to a unison ring 188. The unison ring 188 then proportionally adjusts the position of the variable guide vanes 190 in accordance with the movement of the cam plate 182 and hence coupler 108.

To retract the piston 86, the retraction coil 44 is energized by the controller resulting in the supply pressure (Ps) flowing into the retraction chamber 110 via the retraction control passageway 114 (Pc2) and creating a force (Fp2) on the piston 86, urging the piston 86 to retract leftwards. Again, and at the same time, the extension control passageway 116 (Pc1) is moved into fluid communication with ambient (Pa), thus allowing the working media to flow out of the extension chamber 112 minimizing the resistive force (Fp1).

The proportional valve 12, here a PWM valve, creates a proportional movement of the clevis 24 based upon discrete signals sent from the controller. The control of the air flow is achieved using a suitable control algorithm to precisely sequence energization of the coils 44, 46, as well as through proper selection of springs 60.

It should be appreciated that merely example embodiments of the have been described above. However, many modifications and variations to the example embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. An actuator for positioning guide vanes of a turbine engine, the actuator comprising:
 a housing defining a bore;
 a piston slideably disposed in the bore, the piston having a head spaced from the housing bore and having a rod extending from the head;
 a metallic head seal mounted to the head to create a sliding seal against the housing bore;
 a metallic rod seal mounted to the housing to create a sliding seal against the rod; and an output member coupled to the piston;
wherein the piston is disposed within the bore such that the piston position is independent of the position of the housing and the output member is moveable independent of the position of the housing whereby the housing is substantially isolated from side loads acting on the piston and transferred to the piston head;
wherein the actuator further includes a position sensor for sensing the position of the piston; and
a heat shield at least in part covering the position sensor, wherein the head shield is mounted to be movable with respect to the housing and translate with the piston.

2. The actuator of claim 1, wherein the housing is cantilevered with respect to a support for mounting the actuator to the turbine engine.

3. The actuator of claim 1, wherein there are at least a pair of pistons disposed in at least a pair of associated bores and wherein the pistons are linked by a coupler such that movement of the pistons occurs essentially simultaneously.

4. The actuator of claim 3, wherein each of the pistons has a head spaced from the housing bore and a rod extending from the head with an associated metallic head seal mounted to the head to create a sliding seal against the associated housing bore and an associated metallic rod seal mounted to the housing to create a sliding seal against the associated rod.

5. The actuator of claim 1, wherein the position sensor includes an inner sleeve mounted to the housing by a retainer cap, the inner sleeve having a bore receiving an elongated probe mounted to the heat shield.

6. The actuator of claim 5, wherein the probe is adjustably coupled to the heat shield.

7. The actuator of claim 5, wherein the heat shield is cup-shaped and surrounds the retainer cap and inner sleeve.

8. The actuator of claim 7, further including a link coupling the heat shield to the piston.

9. The actuator of claim 1, further including a valve coupled to the housing in fluid communication with an inlet for receiving working media and controlling flow of the working media to the piston.

10. The actuator of claim 9, wherein the valve includes a cooling circuit.

11. The actuator of claim 10, wherein the cooling circuit includes a collar having a coolant passage for passing coolant through the valve.

12. The actuator of claim 11, wherein the valve includes at least one electromagnetic coil wound about a spindle of an annular coil shell about which the collar is disposed.

13. The actuator of claim 12, wherein the coolant passage is in part formed of a spiral groove in the collar which opens to the coil shell such that coolant in the coolant path directly communicates with the coil shell.

14. The actuator of claim 10, further including a position sensor and wherein the cooling circuit extends proximate the position sensor.

15. The actuator of claim 9, wherein the valve is a proportional valve having an armature and opposed electromagnetic coil arrangements receiving input signals for controlling a position of the armature such that the working media is metered to move the piston in proportion to the input signals.

16. An actuator for positioning guide vanes of a turbine engine, the actuator comprising:
a valve for controlling flow of a working media;
an actuator piston arrangement positioned by flow of the working media from the valve, wherein the piston has a head and a rod extending from the head, wherein the head is spaced from a bore of a housing and metallic head and rod seals create sliding seals sealing off the working media;
a position sensor sensing the position of the actuator piston; and
a heat shield at least in part covering the position sensor and linked to the piston to translate with the piston.

17. An actuator for positioning guide vanes of a turbine engine, the actuator comprising:
a valve for controlling flow of a working media, the valve having a cooling circuit including a coolant passage formed by an annular groove in a collar disposed about an electrical component of the valve;
an actuator piston arrangement positioned by flow of the working media from the valve, wherein the piston has a head and a rod extending from the head, wherein the head is spaced from a bore of a housing and metallic head and rod seals create sliding seals sealing off the working media; and
a position sensor sensing the position of the actuator piston and covered by a heat shield linked to the piston to translate with the piston.

18. An actuator for positioning guide vanes of a turbine engine, the actuator comprising:
a housing defining a bore;
a piston slideably disposed in the bore, the piston having a head spaced from the housing bore and having a rod extending from the head;
a metallic head seal mounted to the head to create a sliding seal against the housing bore;
a metallic rod seal mounted to the housing to create a sliding seal against the rod; and
an output member coupled to the piston;
wherein the piston is disposed within the bore such that the piston position is independent of the position of the housing and the output member is moveable independent of the position of the housing whereby the housing is substantially isolated from side loads acting on the piston and transferred to the piston head;
wherein the actuator further includes a valve coupled to the housing in fluid communication with an inlet for receiving working media and controlling flow of the working media to the piston;
wherein the valve is a proportional valve having an armature and opposed electromagnetic coil arrangements receiving input signals for controlling a position of the armature such that the working media is metered to move the piston in proportion to the input signals; and
wherein the armature is coupled to a clevis supported in a clevis cradle, the clevis having a metering edge for controlling flow of a working media through an orifice in communication with the piston.

* * * * *

UNITED STATES PATENT AND TRADEMARK OFFICE
CERTIFICATE OF CORRECTION

PATENT NO. : 8,226,359 B1
APPLICATION NO. : 13/305483
DATED : July 24, 2012
INVENTOR(S) : Harvey B. Jansen and David K. Shields Page 1 of 1

It is certified that error appears in the above-identified patent and that said Letters Patent is hereby corrected as shown below:

Column 7, line 15: "ORES" should be --CRES--
Column 7, line 28: "ORES" should be --CRES--
Column 8, line 24: "ORES" should be --CRES--

Signed and Sealed this
Sixth Day of November, 2012

David J. Kappos
*Director of the United States Patent and Trademark Office*